United States Patent
Cherolis et al.

(10) Patent No.: US 9,732,628 B2
(45) Date of Patent: Aug. 15, 2017

(54) COOLING PASSAGES FOR A MID-TURBINE FRAME

(71) Applicant: United Technologies Corporation, Hartford, CT (US)

(72) Inventors: Anthony P. Cherolis, Hartford, CT (US); Joshua Daniel Winn, Ellington, CT (US); Jonathan Lemoine, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 265 days.

(21) Appl. No.: 14/663,495

(22) Filed: Mar. 20, 2015

(65) Prior Publication Data

US 2016/0273383 A1    Sep. 22, 2016

(51) Int. Cl.
| | | |
|---|---|---|
| *F01D 9/06* | (2006.01) | |
| *F01D 25/12* | (2006.01) | |
| *F01D 25/16* | (2006.01) | |
| *F02C 7/06* | (2006.01) | |
| *F02C 7/18* | (2006.01) | |

(52) U.S. Cl.
CPC ........... *F01D 25/125* (2013.01); *F01D 9/065* (2013.01); *F01D 25/12* (2013.01); *F01D 25/162* (2013.01); *F02C 7/06* (2013.01); *F02C 7/18* (2013.01); *F05D 2220/3213* (2013.01); *F05D 2260/14* (2013.01); *F05D 2260/20* (2013.01); *Y02T 50/676* (2013.01)

(58) Field of Classification Search
CPC ........ F01D 9/065; F01D 25/12; F01D 25/125; F01D 25/162; F02C 7/08; F02C 7/18; F05D 2220/3213; F05D 2260/14; F05D 2260/20; Y02T 50/676

See application file for complete search history.

(56) References Cited

U.S. PATENT DOCUMENTS

| | | | | |
|---|---|---|---|---|
| 3,403,889 A | * | 10/1968 | Ciokajlo | ............... F01D 25/162 415/118 |
| 4,304,522 A | | 12/1981 | Newland | |
| 4,979,872 A | * | 12/1990 | Myers | ..................... F01D 9/065 403/131 |
| 4,987,736 A | * | 1/1991 | Ciokajlo | ................. F01D 9/065 415/138 |
| 5,076,049 A | * | 12/1991 | Von Benken | ........... F01D 25/24 415/138 |
| 6,102,577 A | | 8/2000 | Tremaine | |
| 7,195,447 B2 | | 3/2007 | Moniz et al. | |

(Continued)

FOREIGN PATENT DOCUMENTS

| | | |
|---|---|---|
| EP | 2573329 | 3/2013 |
| GB | 2263946 | 8/1993 |

OTHER PUBLICATIONS

Extended European Search Report for European Application No. 16160934.2 mailed Aug. 1, 2016.

*Primary Examiner* — Igor Kershteyn

(74) *Attorney, Agent, or Firm* — Carlson, Gaskey & Olds, P.C.

(57) ABSTRACT

A mid-turbine frame for a gas turbine engine includes an inner frame case. A bearing support member is located adjacent the inner frame case. At least one spoke is attached to the inner frame case. A passage extends through at least one spoke, the inner frame case, and the bearing support member.

17 Claims, 5 Drawing Sheets

(56) References Cited

U.S. PATENT DOCUMENTS

| | | |
|---|---|---|
| 8,061,969 B2 | 11/2011 | Durocher et al. |
| 8,091,371 B2 | 1/2012 | Durocher et al. |
| 2006/0093465 A1 | 5/2006 | Moniz et al. |
| 2008/0134687 A1 | 6/2008 | Kumar et al. |
| 2010/0135770 A1 | 6/2010 | Durocher et al. |
| 2010/0275572 A1* | 11/2010 | Durocher ............... F01D 9/065 60/39.08 |
| 2010/0303610 A1* | 12/2010 | Wang ....................... F01D 5/18 415/115 |
| 2011/0079019 A1 | 4/2011 | Durocher et al. |
| 2011/0081237 A1 | 4/2011 | Durocher et al. |
| 2011/0214433 A1* | 9/2011 | Feindel ................ F01D 25/162 60/796 |
| 2013/0028718 A1* | 1/2013 | Strom .................... F01D 9/065 415/182.1 |
| 2013/0052006 A1* | 2/2013 | Petty ....................... F01D 25/24 415/213.1 |
| 2013/0094951 A1 | 4/2013 | McCaffrey |
| 2014/0013771 A1* | 1/2014 | Farah ....................... F02C 7/20 60/797 |
| 2014/0102110 A1 | 4/2014 | Farah et al. |

\* cited by examiner

COOLING PASSAGES FOR A MID-TURBINE FRAME

BACKGROUND

The present disclosure relates generally to a gas turbine engine, and in particular to a mid-turbine frame (MTF) included in a gas turbine engine.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A mid-turbine frame (MTF) is positioned between a high pressure turbine stage and a low pressure turbine stage of a gas turbine engine. The MTF supports one or more bearings and transfers bearing loads from an inner portion of the gas turbine engine to an outer engine frame. The MTF also serves to route cooling air from the high pressure compressor stage to the low pressure turbine stage.

SUMMARY

In one exemplary embodiment, a mid-turbine frame for a gas turbine engine includes an inner frame case. A bearing support member is located adjacent the inner frame case. At least one spoke is attached to the inner frame case. A passage extends through at least one spoke, the inner frame case, and the bearing support member.

In a further embodiment of the above, a fitting connects at least one spoke to the inner frame case.

In a further embodiment of any of the above, the fitting includes a transfer tube that connects at least one spoke to a cup boss. An inlet to the cup boss has a first cross sectional shape and an outlet to the cup boss has a second different cross sectional shape.

In a further embodiment of any of the above, the first cross sectional shape is circular and the second cross sectional shape is non-circular.

In a further embodiment of any of the above, a centerline of the first cross sectional shape is offset from a centerline of the second cross sectional shape.

In a further embodiment of any of the above, the cup boss includes a base portion that has a curvature.

In a further embodiment of any of the above, the curvature of the base portion matches a curvature of the inner frame case.

In a further embodiment of any of the above, a swirler tube is connected to the bearing support member for directing cooling airflow in a direction of rotation of a low pressure turbine.

In a further embodiment of any of the above, the swirler tube includes a base portion for engaging the bearing support member and a passage portion that extends from the base portion.

In a further embodiment of any of the above, the base portion includes a curvature that matches a curvature of the bearing support member.

In a further embodiment of any of the above, the base portion includes at least one locating tab for engaging a portion of the bearing support member if oriented incorrectly relative to the bearing support member.

In another exemplary embodiment, a gas turbine engine includes a mid-turbine frame located axially between a first turbine and a second turbine. The mid-turbine frame includes an inner frame case. A bearing support member is located adjacent the inner frame case. At least one spoke is attached to the inner frame case. A passage extends through at least one spoke, the inner frame case, and the bearing support member.

In a further embodiment of any of the above, a fitting connects at least one spoke to the inner frame case. The fitting includes a cup boss that has an inlet to the cup boss having a first cross sectional shape and an outlet to the cup boss having a second different cross sectional shape.

In a further embodiment of any of the above, the first cross sectional shape is circular and the second cross sectional shape is non-circular.

In a further embodiment of any of the above, a centerline of the first cross sectional shape is offset from a centerline of the second cross sectional shape.

In a further embodiment of any of the above, the cup boss includes a base portion that has a curvature that matches a curvature of the inner frame case.

In a further embodiment of any of the above, a swirler tube connects to the bearing support member for directing cooling airflow in a direction of rotation of a low pressure turbine.

In a further embodiment of any of the above, the swirler tube includes a base portion for engaging the bearing support member and a passage portion that extends from the base portion.

In a further embodiment of any of the above, the base portion includes a curvature that matches a curvature of the bearing support member.

In a further embodiment of any of the above, the base portion includes at least one locating tab for engaging a portion of the bearing support member if oriented incorrectly relative to the bearing support member.

DETAILED DESCRIPTION

Figure 1:
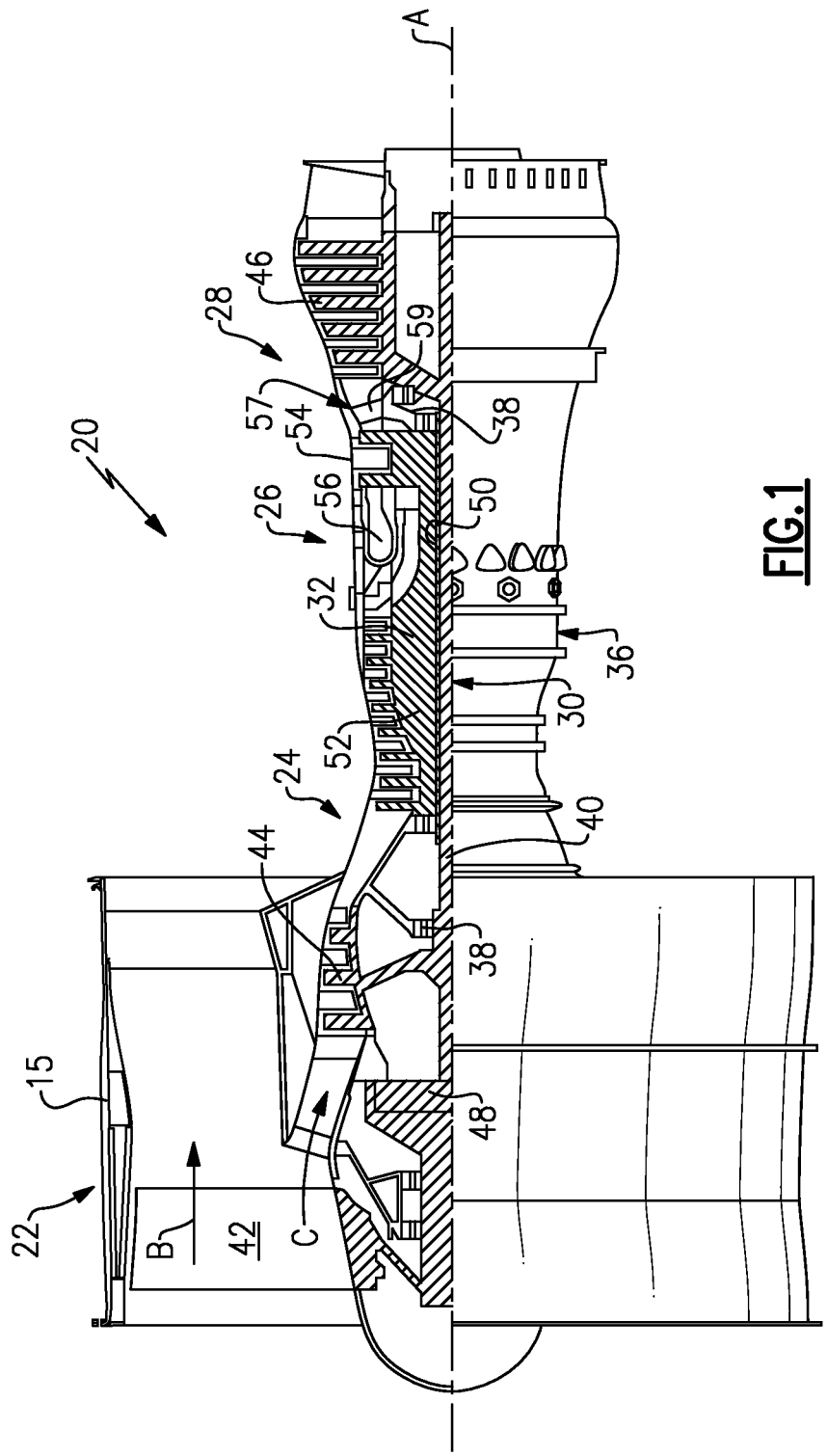
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° R)/(518.7° R)]^{0.5}$. The "Low corrected fan tip speed" as disclosed herein according to one non-limiting embodiment is less than about 1150 ft/second (350.5 meters/second).

The example gas turbine engine includes fan 42 that comprises in one non-limiting embodiment less than about 26 fan blades. In another non-limiting embodiment, fan section 22 includes less than about 20 fan blades. Moreover, in one disclosed embodiment low pressure turbine 46 includes no more than about 6 turbine rotors schematically indicated at 34. In another non-limiting example embodiment low pressure turbine 46 includes about 3 turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Figure 2:
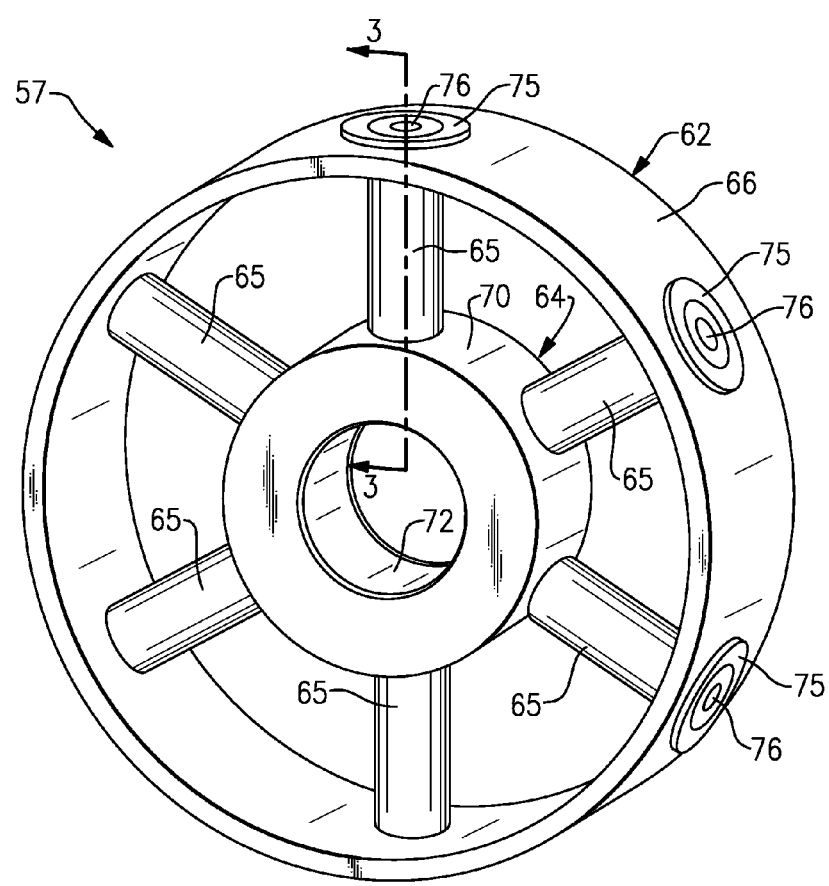
FIG. 2 is a schematic perspective view of an example mid-turbine frame in the gas turbine engine.

FIG. 2 is a schematic perspective view of one embodiment of mid-turbine frame 57. The schematic view shown in FIG. 2 is high level conceptual view and is intended to illustrate relative positioning of various components, but not actual shape of various components. The mid-turbine frame 57 includes an outer frame case 62, an inner frame case 64, and a plurality of hollow spokes 65. The outer frame case 62 includes an outer diameter surface 66. The inner frame case 64 includes an outer diameter surface 70 and an inner diameter surface 72. In the embodiment shown in FIG. 2, six hollow spokes 65 are distributed evenly around the circumference of the inner frame case 64 to provide structural support between the inner frame case 64 and the outer frame case 62. In the illustrated embodiment, each of the hollow spokes 65 is directly opposite (i.e. 180 degrees from) another of the hollow spokes 65. In alternative embodiments, the mid-turbine frame 57 can have an any number of hollow spokes greater than or less than six.

The inner frame case 64 supports the rotor assembly via the bearing systems 38 (shown in FIG. 1), and distributes the force from the inner frame case 64 to the outer frame case 62 via the plurality of hollow spokes 65. Attachment of the hollow spokes 65 to the outer frame case 62 is provided at a plurality of bosses 75 located circumferentially around the outer diameter surface 66 of the outer frame case 62.

In one embodiment, attachment of the hollow spokes 65 at the plurality of bosses 75 may be secured by a retaining nut (shown in FIG. 3) that allows the hollow spokes 65 to be tensioned. The hollow spokes 65 can be tensioned via a threaded connection so as to remain in tension during substantially all operating conditions of gas turbine engine 20. Apertures 76 formed in each of the plurality of bosses 75 allow cooling airflow to be distributed into a hollow portion of each of the hollow spokes 65. In this way, the cooling airflow is directed from the outer diameter through the hollow portions of the cooled hollow spokes 65 towards the inner frame case 64. The cooling airflow can function to cool the hollow spokes 65 and also to cool components radially inward of the inner frame case 64, such as the bearing systems 38.

Figure 3:
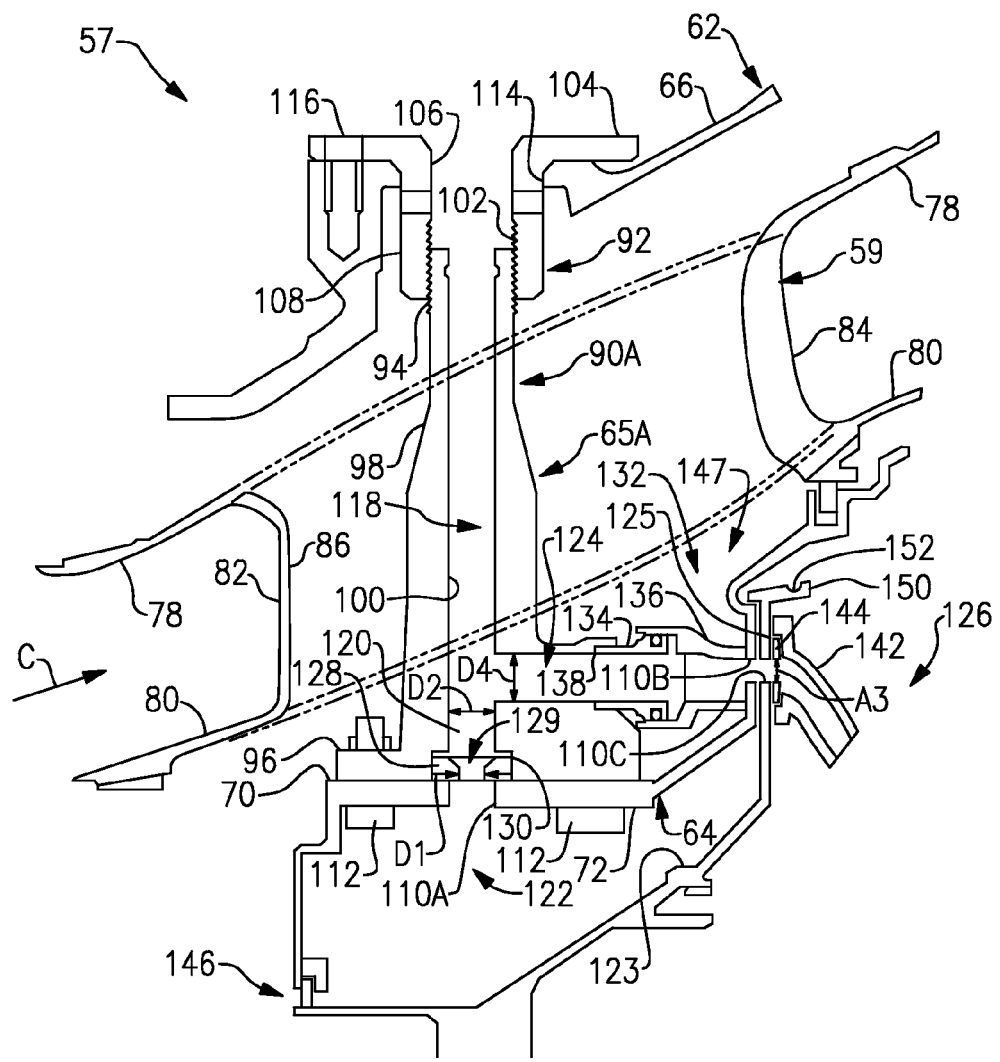
FIG. 3 is a cross section view taken along line 3-3 of FIG. 2.

FIG. 3 is a cross-sectional view of the mid-turbine frame 57 taken along line 3-3 of FIG. 2. A hollow spoke 65A is one example of the hollow spokes 65 shown in FIG. 2. The hollow spoke 65A extends from the outer frame case 62 through the airfoil 59 to the inner frame case 64. The airfoil 59 extends from an outer platform 78 to an inner platform 80. In the illustrated embodiment, the airfoil 59, the outer platform 78, and the inner platform 80 are integrally formed, and are all positioned radially inward of the outer frame case 62 and radially outward of the inner frame case 64. The airfoil 59, the outer platform 78, and the inner platform 80 define a portion of the core flow path C at the mid-turbine frame 57. The airfoil 59 extends axially from a leading edge 82 to a trailing edge 84. The airfoil 59 is oblong so as to be longer in the axial direction than in the circumferential direction. The airfoil 59 has a hollow interior 86, which is also relatively narrow in a circumferential direction.

In the illustrated embodiment, the hollow spoke 65A includes a tie rod 90A and a retaining nut 92. The tie rod 90A is an elongated hollow tube that includes a threaded surface 94 at a radially outer end and a flange 96 at a radially inner end. The threaded surface 94 is on an outer surface 98 of the tie rod 90A. An inner passage surface 100 of the tie rod 90A defines an inlet passage 118 through the tie rod 90A. The tie rod 90A tapers along its length from the flange 96 at its radially inner end to the threaded surface 94 at its radially outer end.

The retaining nut 92 includes a threaded surface 102 at a radially inner end of the retaining nut 92 and a flange 104 at a radially outer end of the retaining nut 92. The threaded surface 102 is on an inner surface 106 of the retaining nut 92. The flange 104 extends outward from an outer surface 108 of the retaining nut 92.

In the illustrated embodiment, the flange 96 of the tie rod 90A abuts against the inner frame case 64 so that the inner passage surface 100 aligns with a hole 110A in the inner frame case 64. The flange 96 is attached to the inner frame case 64 via bolts 112. The retaining nut 92 extends through a hole 114 in the outer frame case 62 such that the flange 104 abuts against the outer diameter surface 66 of the outer frame case 62. The flange 104 is attached to the outer frame case 62 via a bolt 116. The bolt 116 extends through the flange 104 into the outer frame case 62. The tie rod 90A is threaded into the retaining nut 92 to attach the tie rod 90A to the retaining nut 92. In the illustrated embodiment, a portion but not all of the threaded surface 94 overlaps with a portion but not all of the threaded surface 102.

During assembly, the tie rod 90A is inserted through the hollow interior 86 of the airfoil 59 in a direction from radially inward to radially outward. The inner frame case 64 is then positioned radially inward of the tie rod 90A and attached to the tie rod 90A by the bolts 112. The retaining nut 92 is then inserted through the hole 114 and threadedly engaged with the tie rod 90A. The retaining nut 92 can be tightened, as desired, in a manner described below. Once the retaining nut 92 is suitably tightened on the tie rod 90A, the bolt 116 is inserted to fix the retaining nut 92 to the outer frame case 62 to prevent the retaining nut 92 from rotating and loosening.

Because the threaded surface 94 overlaps with the threaded surface 102 only partially, the threaded connection between the retaining nut 92 and the tie rod 90A is variable. The retaining nut 92 does not bottom out at any particular point when threaded on the tie rod 90A. This allows the retaining nut 92 to be threaded on the tie rod 90A to an extent determined during assembly, not predetermined prior to assembly. This allows the hollow spoke 65A, and the mid-turbine frame 57 in general, to be relatively insensitive to manufacturing tolerances.

The inlet passage 118 branches off between a first branch 120 extending into a bearing support cavity 122 and a second branch 124 extending into a low-rotor cavity 126. The bearing support cavity 122 is at least partially defined by the inner frame case 64 and a bearing support member 123. The first branch 120 extends in a radially inward direction through the inner frame case 64. The bearing support member 123 carries structural load from the inner frame case 64 to the bearing interface with the outer shaft 50. The bearing support member 123 has a bolted flange 125 for connecting to the inner frame case 64.

A plug 128 is aligned with the first branch 120 and is located in an opening 130 in the hollow spoke 65A adjacent the outer diameter surface 70 of the inner frame case 64. The plug 128 includes an opening 129 having a conical radially outer portion that tapers to a cylindrical channel on a radially inner side. The cylindrical channel of the plug 128 includes a diameter D1 that is smaller than a diameter D2 defined by the inner passage surface 100.

In the illustrated example, the plug 128 includes a diameter D1, however, the diameter D1 could be any dimension that is smaller than the dimension D2 in order to control the amount of cooling airflow that travels into the bearing support cavity 122. The cooling airflow entering the bearing support cavity 122 maintains positive pressure inside the bearing support cavity 122 in order to cool the adjacent components and prevent ingestion of hotter gases from the cavity between the vane platform 80 and the inner frame case 64. A piston seal 146 is located adjacent the inner frame case 64 to minimize the leakage flow from the bearing support cavity 122 axially forward towards the high pressure turbine 54.

Although the plug 128 is shown contacting the hollow spoke 65A and the inner frame case 64, the plug 128 could be located anywhere within the first branch 120. Alternatively, the plug 128 could be solid and prevent the cooling airflow from entering the bearing support cavity 122 so the entire cooling airflow must travel through the second branch 124. Alternatively, rather than a separate piece, the reduced diameter D1 could be integral to the inner frame case 64 or the hollow spoke 65A.

The second branch 124 extends in an axially downstream direction perpendicular to the first branch 120. Although the second branch 124 is shown being perpendicular to the first branch 120, the second branch 124 could be within 20 degrees of being perpendicular to the first branch 120. The second branch 124 is in fluid communication with the low-rotor cavity 126 through to a fitting 132 that extends through the inner frame case 64 and the bearing support member 123 where the inner frame case 64 is bolted to the flange 125 on the bearing support member 123. The second branch 124 continues into the low-rotor cavity 126 via a swirler tube 142.

The fitting 132 includes a transfer tube 134 pressed into an opening 138 in the hollow spoke 65A on a first end and engages a cup boss 136 on a second end. A piston seal creates a seal between an outer diameter of the transfer tube 134 and the cup boss 136. The cup boss 136 is fastened to the inner frame case 64 with fasteners 140 (FIG. 11) and is aligned with a hole 110B in the inner frame case 64 and a hole 110C in the bearing support member 123. The fasteners 140 also secure the swirler tube 142 to an opposite side of the bearing support member 123 from the inner frame case 64. The swirler tube 142 directs the cooling airflow into the low-rotor cavity 126 in the direction of rotation of the low rotor to reduce turning and aerodynamic losses in the cooling airflow.

The bearing support member 123 includes a rim 150 on a radially outer end of the flange 125. The rim 150 extends in an axial direction and includes a recess 152 on a radially outer surface for engaging a pulling tool to remove the bearing support member 123 from the gas turbine engine 20.

A restricting ring 144 is located between the swirler tube 142 and the inner bearing support member 123. The restricting ring 144 includes a restricting area A3 which is smaller than the area defined by diameter D4 of the second branch 124. The restricting ring 144 restricts the amount of cooling airflow through the second branch 124 to aid in dividing the amount of cooling airflow traveling into the bearing support cavity 122 and the low-rotor cavity 126. Although the restricting ring 144 is shown between the swirler tube 142 and bearing support member 123, the restricting ring 144 could be located anywhere within the second branch 124 to reduce the cooling airflow into the low-rotor cavity 126. In one example, a first portion of cooling airflow travels into the bearing support cavity 122 and a second portion of cooling airflow travels into the low-rotor cavity 126, with the second portion being greater than the first portion. The restricting area A3 could alternatively be formed by the hole 110C through the flange 125 in the bearing support member 123, or be integrally formed by a feature in the cup boss 136 or the swirler tube 142.

Figure 4:
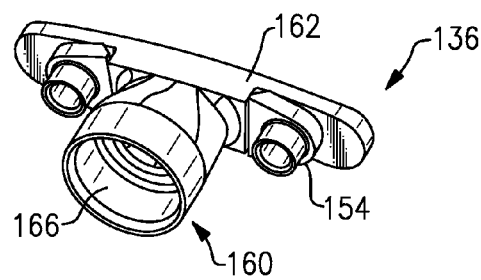
FIG. 4 is a perspective view of an example cup boss.
Figure 5:
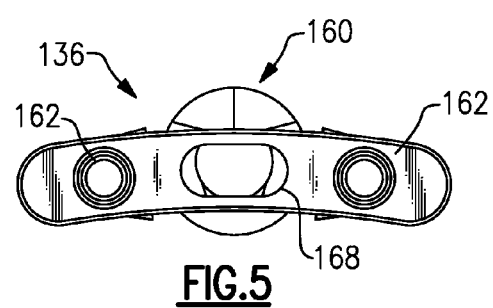
FIG. 5 is an aft view of the example cup boss of FIG. 4.

As shown in FIG. 4, the cup boss 136 includes a transition portion 160 that engages the transfer tube 134 on a proximal end and a base portion 162 on a distal end. The transition portion 160 includes an inlet 166 forming a circular opening for accepting a piston seal 164 on the transfer tube 134 to form a seal between the transfer tube 134 and the cup boss 136. The base portion 162 includes an outlet 168 having a race track shaped cross section.

As the second branch 124 passes through the cup boss 136, the second branch 124 transitions from having a circular cross section at the inlet 166 to having a race track shaped cross section at the outlet 168. The race track shaped cross section includes a pair of opposing parallel sides connected by a pair of rounded ends. The holes 110B and 110C and the swirler tube 142 also have race track shaped cross sections that aid in diffusing the cooling airflow traveling through the second branch 124. Alternatively, the second branch 124 could transition from a circular cross section to an arcuate race track, an oval, an ellipse, or remain circular in cross section with a different cross sectional area.

Figure 6:
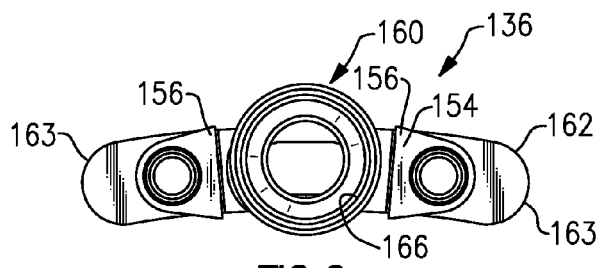
FIG. 6 is a forward view of the example cup boss of FIG. 4.
Figure 7:
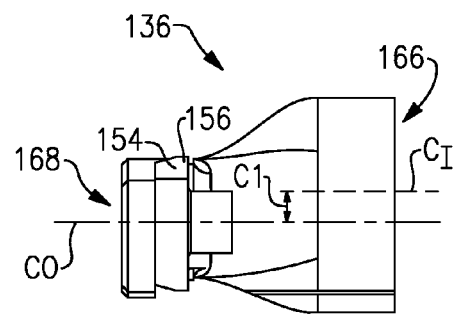
FIG. 7 is a side view of the example cup boss of FIG. 4.

As shown in FIG. 6, the base portion 162 of the cup boss 136 includes distal ends 163 that extend outward beyond the clinch nuts 154. The extending distal ends 163 on the base portion 162 allow the base portion 162 to have a larger area with a curvature. The curvature follows a curvature of a circumference of the inner frame case 64 to ensure that the cup boss 136 is installed relative to the inner frame case 64 in the proper orientation by matching the curvature of the base portion 162 with the curvature of the inner frame case 64.

Because the cross sectional shape of the second branch 124 in the cup boss 136 transitions over the length of the transition portion 160, losses in pressure in the cooling airflow are reduced. Losses in pressure would normally occur if there was an abrupt change in cross sectional shape and/or area in the transition portion 160. An inlet centerline CI through the inlet 166 is vertically offset by a distance C1 from an outlet centerline CO of the outlet 168 such that the outlet centerline CO is spaced radially inward from the inlet centerline CI. In another example, the outlet centerline CO could be spaced radially outboard from the inlet centerline CI.

The fasteners 140 engage clinch nuts 154 that each include anti-rotation features 156 that engage the cup boss 136 to prevent the clinch nuts 154 from rotating relative to the cup boss 136 when rotating the fasteners 140.

Figure 8:
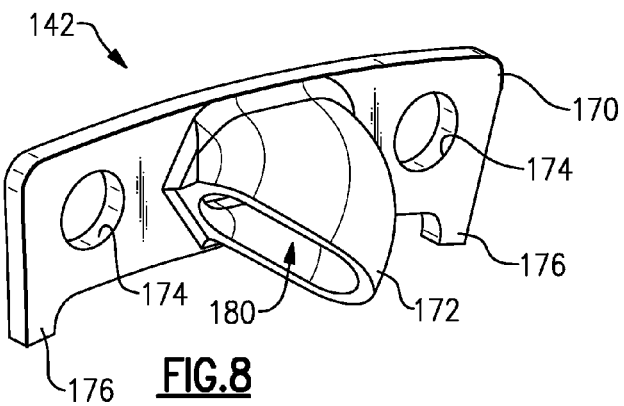
FIG. 8 is a perspective view of an example swirler tube.
Figure 9:
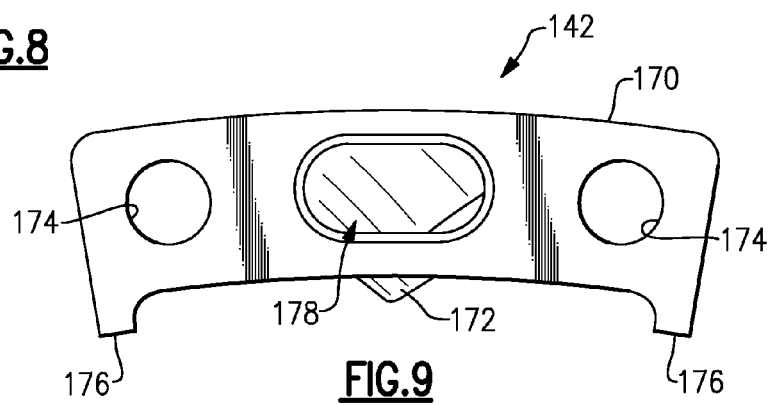
FIG. 9 is an aft view of the example swirler tube of FIG. 8
Figure 10:
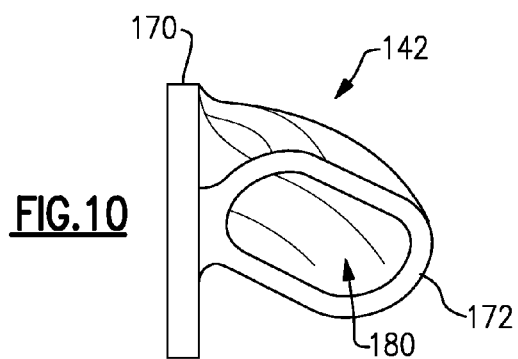
FIG. 10 is a side view of the example swirler tube of FIG. 8.

As shown in FIGS. 8-10, the swirler tube 142 includes a base portion 170 and a passage portion 172. The base portion 170 includes a pair of fastener openings 174 and a pair of locating tabs 176 extending from opposite sides of the base portion 170. The base portion 170 includes an inlet 178 and the passage portion 172 includes an outlet 180. Both the inlet 178 and the outlet 180 to the swirler tube 142 include a race track shaped cross section to match the cross section of the outlet 168 of the cup boss 136.

Figure 11:
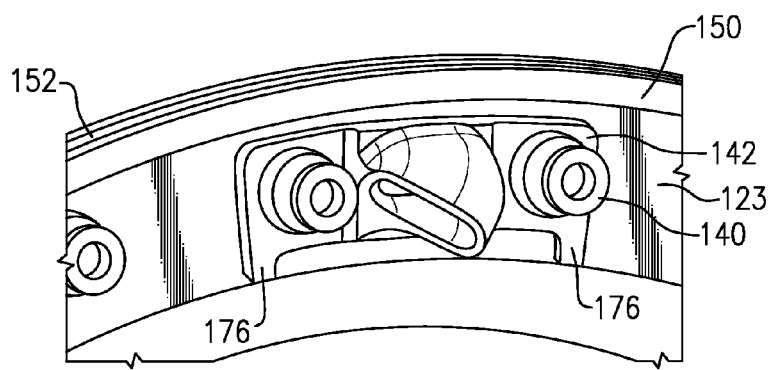
FIG. 11 illustrates a perspective view of the example swirler tube of FIG. 8 attached to an example bearing support member.

As shown in FIGS. 9 and 11, the base portion 170 of the swirler tube 142 includes a curvature that matches a curvature of the bearing support member 123 to ensure that the swirler tube 142 is installed relative to the bearing support member 123 in the proper orientation such that the cooling airflow travels into the low-rotor cavity 126 in the direction of rotation of the low pressure turbine 46.

In addition to the curvature of the swirler tube 142 ensuring proper orientation of the swirler tube 142, the pair of locating tabs 176 also ensure that the swirler tube 142 is oriented properly relative to the bearing support member 123. When installing the swirler tube 142 in an incorrect orientation, the pair of locating tabs 176 engage the rim 150 on the bearing support member 123 to prevent improperly orientating the swirler tube 142 during installation.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A mid-turbine frame for a gas turbine engine comprising:
an inner frame case;
a bearing support member located adjacent the inner frame case;
at least one spoke attached to the inner frame case;
a passage extending through the at least one spoke, the inner frame case, and the bearing support member; and
a fitting connecting the at least one spoke to the inner frame case, wherein the fitting includes a transfer tube connecting the at least one spoke to a cup boss with an inlet to the cup boss having a first cross sectional shape and an outlet to the cup boss having a second different cross sectional shape.

2. The mid-turbine frame of claim 1, wherein the first cross sectional shape is circular and the second cross sectional shape is non-circular.

3. The mid-turbine frame of claim 2, wherein a centerline of the first cross sectional shape is offset from a centerline of the second cross sectional shape.

4. The mid-turbine frame of claim 1, wherein the cup boss includes a base portion having a curvature.

5. The mid-turbine frame of claim 4, wherein the curvature of the base portion matches a curvature of the inner frame case.

6. The mid-turbine frame of claim 1, further comprising a swirler tube connected to the bearing support member for directing cooling airflow in a direction of rotation of a low pressure turbine.

7. The mid-turbine frame of claim 6, wherein the swirler tube includes a base portion for engaging the bearing support member and a passage portion that extends from the base portion.

8. The mid-turbine frame of claim 7, wherein the base portion includes a curvature that matches a curvature of the bearing support member.

9. The mid-turbine frame of claim 7, wherein the base portion includes at least one locating tab for engaging a portion of the bearing support member if oriented incorrectly relative to the bearing support member.

10. A gas turbine engine comprising:
a mid-turbine frame located axially between a first turbine and a second turbine, the mid-turbine frame comprising:
an inner frame case;
a bearing support member located adjacent the inner frame case;
at least one spoke attached to the inner frame case;
a passage extending through the at least one spoke, the inner frame case, and the bearing support member; and
a fitting connecting the at least one spoke to the inner frame case, wherein the fitting includes a cup boss having an inlet to the cup boss having a first cross sectional shape and an outlet to the cup boss having a second different cross sectional shape.

11. The gas turbine engine of claim 10, wherein the first cross sectional shape is circular and the second cross sectional shape is non-circular.

12. The gas turbine engine of claim 10, wherein a centerline of the first cross sectional shape is offset from a centerline of the second cross sectional shape.

13. The gas turbine engine of claim 10, wherein the cup boss includes a base portion having a curvature that matches a curvature of the inner frame case.

14. The gas turbine engine of claim 10, further comprising a swirler tube connected to the bearing support member for directing cooling airflow in a direction of rotation of a low pressure turbine.

15. The gas turbine engine of claim 14, wherein the swirler tube includes a base portion for engaging the bearing support member and a passage portion that extends from the base portion.

16. The gas turbine engine of claim 15, wherein the base portion includes a curvature that matches a curvature of the bearing support member.

17. The gas turbine engine of claim 15, wherein the base portion includes at least one locating tab for engaging a portion of the bearing support member if oriented incorrectly relative to the bearing support member.

* * * * *